C. COLLINS.
FIREPROOF BUILDING CONSTRUCTION.
APPLICATION FILED AUG. 19, 1908.
Reissued Feb. 23, 1909. 12,922.
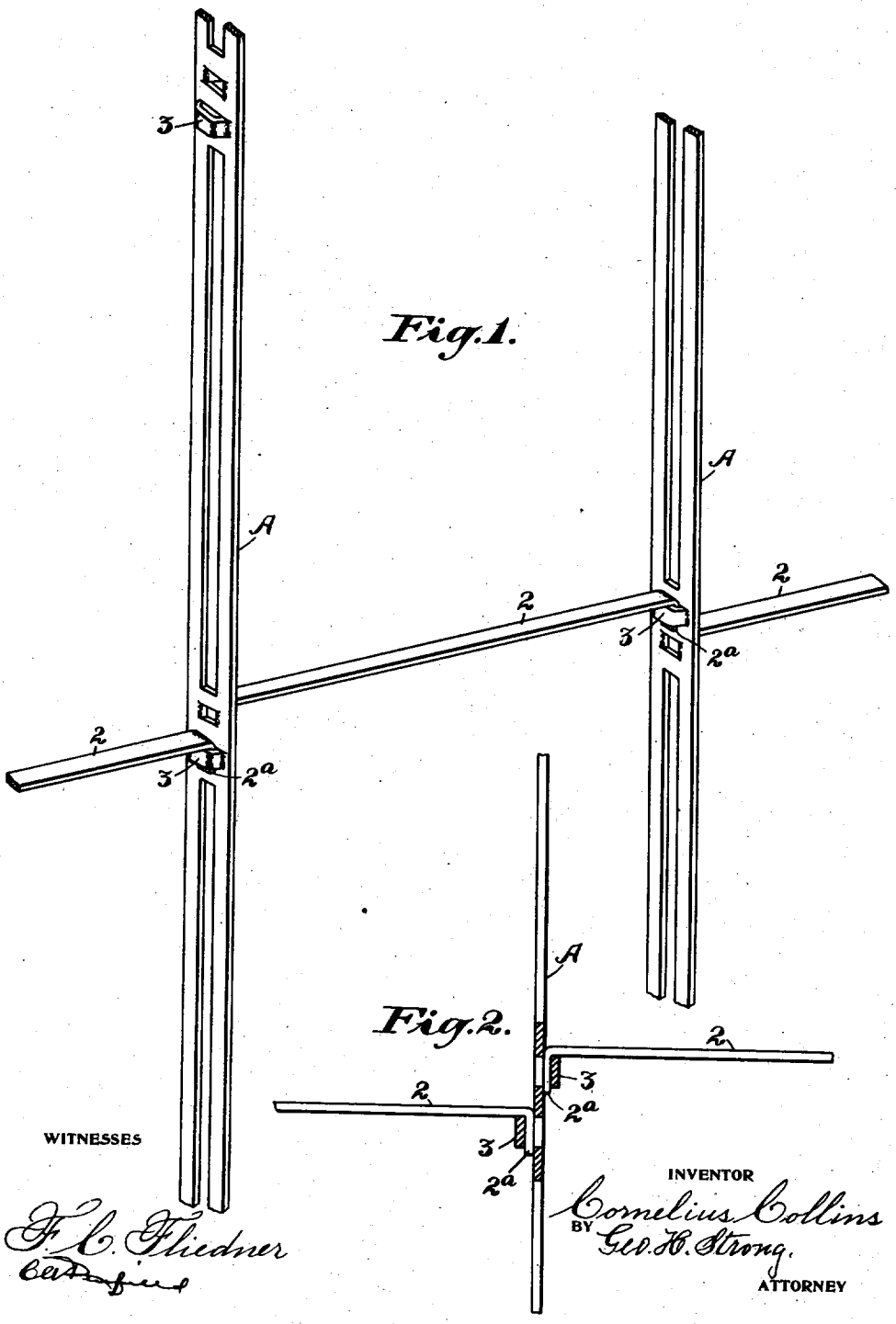
WITNESSES
F. C. Fliedner
C. A. Griffin
INVENTOR
Cornelius Collins
BY Geo. H. Strong.
ATTORNEY
THE NORRIS PETERS CO., WASHINGTON, D. C.

UNITED STATES PATENT OFFICE.

CORNELIUS COLLINS, OF SAN FRANCISCO, CALIFORNIA.

FIREPROOF BUILDING CONSTRUCTION.

No. 12,922. Specification of Reissued Letters Patent. Reissued Feb. 23, 1909.

Original No. 885,439, dated April 21, 1908, Serial No. 389,456. Application for reissue filed August 19, 1908. Serial No. 449,384.

*To all whom it may concern:*

Be it known that I, CORNELIUS COLLINS, a citizen of the United States, residing in the city and county of San Francisco, State of California, have invented an Improvement in Fireproof Building Construction; and I hereby declare the following to be a full, clear, and exact description of the same.

My invention relates to improvements in fire-proof building construction wherein light and rigid metallic framework is employed for partitions, furrings, ceilings and other sub-dividing structures.

My invention consists in the combination of parts and in details of construction which will be more fully explained by reference to the accompanying drawings, in which—

Figure 1 is a perspective view illustrating my invention. Fig. 2 is a vertical section of part of one of the members.

It is the object of my present invention to economize in the use of material which is employed for such structures, and it is effected by cutting sections from the strips, using such removed sections as connections between the contiguous strips, and so forming the strips that said connecting pieces may be readily engaged therewith.

The strips A of which my proposed building construction is composed, may have any desired rigidity, but they may preferably be made of sheet-metal having little inherent rigidity; and this metal is cut into strips which may have a width substantially equal to the distance between the opposite faces of the partition or other part in which they are used.

In the present drawing I have shown my device as designed for vertical partitions, but it will be understood that these strips may be used either vertically or horizontally in the construction of the several parts of the building.

For present purposes I will term these strips A as uprights, and for the purpose of this description, I will assume that they are designed for a fire-proof partition employing metal, and a surface or surfaces of concrete or equivalent plastering material.

It is desirable on account of the costly character of such structures to economize the interior space as much as possible, by making the interior walls, ceilings and floors as thin as is consistent with safety and sufficient solidity to maintain them in place without vibration, and to make them fireproof and resistant.

The strips of metal A may be formed either flat, or of angle, or channel form. They are here shown as flat, and at intervals in the length, strips or sections 2 are punched out. These strips are of sufficient length to extend between adjacent vertical members of the partition, when the latter are set up in place, and sufficiently longer than the distance between said strips A so that they may be provided with means for attachment to the adjacent vertical members. The openings which are caused by the cutting out of these strips or sections 2 serve both to lighten the structure, and to provide spaces substantially in line with each other, so that water, gas, or other pipes, electrical wires, etc., may be let through these spaces, and be concealed and protected therein. Between these spaces transverse slits may be made a suitable distance apart, and the intermediate strip 3, which remains attached at both ends to the strips A may be stamped, or otherwise forced to bend outward away from the strip upon one side, sufficiently to form a channel which will receive the end of the strip 2. This end is bent at right angles with the main portion of the strip, as shown at $2^a$, thus forming a hook which may be readily introduced into the slit formed by the raised tongue 3, and as the strip 2 is made long enough to extend between the contiguous vertical strips A, plus a portion which may be turned down at each end, it will be seen that these strips, being hooked into the loops 3, will connect the verticals at as many points in their height as may be desired. In order to form a continuous support of this character, I have found it very satisfactory to form two of the loops or clips 3 contiguous to each other; the loops being bent in opposite directions so that connections may be made between two of the uprights by means of the uppermost of the clips 3, and connections between two of the next contiguous uprights by hooking the bars 2 into the lower loops, which are bent or sprung out upon the side in which the strip 2 is placed. Thus I have a connection of plates alternately above and below a common plane, but sufficiently in line to provide all necessary rigidity to the vertical strips A. Such a structure is very easily set up or taken down, and when set up, it has all the necessary rigidity in the direction of the length of the partition, while the width of the strips from edge to edge insures stiffness in the direction of its thickness.

Having thus described my invention, what I claim and desire to secure by Letters Patent is—

1. A building structure consisting of vertical metal strips having rectangular sections cut out at intervals, and loops formed transversely and alternately upon opposite sides of the strips, said removed tongues or sections having their ends bent into hook form and engaged with the loops.

2. Vertical partition strips standing transversely to the plane of the partition, said strips having tongues cut out therefrom, leaving openings through the strips, said tongues having their ends bent at right angles, and a length substantially equal to the distance between two adjacent strips, and loops formed transversely in the partitioned strips between the longitudinal channels, with which loops the bent ends of the tongues are engaged.

3. In building and like structures, metallic partition and floor-supporting strips, tongues cut out to leave longitudinal openings, said tongues having their ends bent into hook form, and loops formed transversely and between the ends of the longitudinal openings to receive said hooks and unite and support the strips.

4. In a metal partition, vertical strips arranged transverse to the plane of the partition and having transverse loops struck out, and brace strips having hook-shaped ends to be passed in behind the loops so that one side of each hook is supported by the vertical strip at two separated points upon one side, and with the loop forming an opposing support on the opposite side of the hook and between the two points of support afforded by the strip.

5. The combination with a strip having a struck-out loop, of a brace-strip having a bent end passed entirely through the loop whereby the upper and lower ends of the bent portion of the brace-strip will engage the first strip at separated points adjacent to the upper and lower walls of the opening formed by striking out the loop, and the inner wall of said loop will form an opposing support which lies in a plane which is intermediate of the said separated points of support.

In witness whereof I have hereunto set my hand.

CORNELIUS COLLINS.

Witnesses:
A. E. De Armond,
Henry P. Tricou.